UNITED STATES PATENT OFFICE 2,671,099

HEXAORGANOETHYNYL SILICON DERIVATIVES

Kurt C. Frisch, Pittsfield, Mass., and Robert B. Young, Schenectady, N. Y., assignors to General Electric Company, a corporation of New York No Drawing. Application March 15, 1952, Serial No. 276,871

4 Claims. (Cl. 260—448.2)

This invention is concerned with novel silicon compositions. More particularly, the invention relates to compositions of matter corresponding to the general formula:

I.
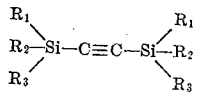

where $R_1$, $R_2$ and $R_3$ are monovalent hydrocarbon radicals.

Among the values which $R_1$, $R_2$ and $R_3$ may be are, for instance, aliphatic, including lower alkyl radicals (e. g., methyl, ethyl, propyl, isopropyl, butyl, hexyl, dodecyl, etc.), unsaturated aliphatic radicals (e. g., vinyl, allyl, methallyl, etc.), as well as cycloaliphatic radicals (e. g., cyclopentyl, cyclopentenyl, cyclohexyl, etc.); aryl radicals (e. g., phenyl, biphenyl, naphthyl, etc.); alkaryl radicals (e. g., tolyl, xylyl, ethylphenyl, etc.); aralkyl radicals (e. g., benzyl, phenylethyl, etc.); and their homologues. It will, of course, be understood by those skilled in the art that $R_1$, $R_2$ and $R_3$ may represent the same or different monovalent hydrocarbon radicals of the class described above.

The above-mentioned acetylenic silicon compositions may be prepared in various ways. One method, which has been found particularly effective, is to effect reaction between a Grignard reagent corresponding to the general formula:

II.          $X-Mg-C\equiv C-MgX$ and an organohalogenosilane of the formula:

III.
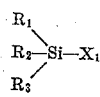

where $R_1$, $R_2$ and $R_3$ have the meanings given above, and $X$ and $X_1$ are halogens, $X$ preferably being bromine, and $X_1$ preferably being chlorine. Among the halogens which $X$ and $X_1$ may represent are, for example, chlorine, bromine, fluorine, etc. A particularly effective Grignard reagent is acetylene dimagnesium dibromide having the formula:

$$BrMg-C\equiv C-MgBr$$

Generally, for each mol of acetylene dimagnesium dihalide, there is employed at least 2 mols of the triorganohalogenosilane, for example, from 2 to 4 or more mols of the latter material. The reaction is preferably carried out in the presence of a catalyst, for instance, powdered cuprous chloride which is added to the ether solution of the acetylene dimagnesium dihalide. The reaction whereby the compositions herein described may be prepared may be considered as formed according to the following equation:

$X-Mg-C\equiv C-Mg-X+R_1R_2R_3SiX_1 \rightarrow$
$\quad\quad MgXX_1+R_1R_2R_3Si-C\equiv C-SiR_1R_2R_3$ where $X$, $X_1$, $R_1$, $R_2$, and $R_3$ have the meanings given above.

Thereafter, the triorganohalogenosilane is added to the ether solution and preferably stirred at room temperature for several hours and then heated for a period of time ranging from about 2 to 6 hours at the reflux temperature of the mass. The precipitate thus obtained is advantageously filtered from the salts formed, washed several times with organic solvents, e. g., diethyl ether, and the filtrate and washings fractionally distilled to give the desired product.

The acetylene dimagnesium dibromide may be prepared by reacting ethyl magnesium bromide with dry acetylene for the necessary period of time, removing the excess acetylene by sweeping nitrogen through the reaction mass, and separating the acetylene dimagnesium dibromide layer which is generally at the bottom. As is known to persons skilled in the art, the ethyl magnesium bromide may be prepared by reacting magnesium turnings in a large excess of ether with ethyl bromide.

In order that those skilled in the art may better understand how the present invention may be practiced, the following examples are given by way of illustration and not by way of limitation. All parts are by weight.

Example 1

Ethyl magnesium bromide was prepared by adding 96.8 grams of magnesium turnings to 400 cc. ether and thereafter adding 436 grams ethyl bromide and 1200 cc. of diethyl ether. This mixture was stirred thoroughly until it was evident that complete reaction had taken place to form the ethyl magnesium bromide Grignard reagent. This preparation of the Grignard reagent is well known to persons skilled in the art and requires no further details. Thereafter, dry acetylene was passed through the Grignard solution for about 18 hours. At the end of this time nitrogen was used to sweep out the excess acetylene. At this point two layers had formed with the grayish-black acetylene dimagnesium bromide at the bottom and the almost clear ether layer above. To the ether mixture of acetylene dimagnesium dibromide and ether described above was added with stirring 8 grams of powdered cuprous chloride. This addition proceeded with some heat evolution and the mixture had to be cooled. The resulting mixture was added gradually with stirring to 434 grams (4 mols) trimethylchlorosilane. A voluminous white precipitate formed which became so dense it had to be broken up and more ether was added to permit continuation of the stirring. Afterwards it was stirred for about 12 hours at room temperature and was then refluxed at the reflux temperature of the reaction mass for about 4½ hours. The precipitate was filtered and washed with several portions of diethyl ether. The solvent was removed from the filtrate and the residual liquid fractionally distilled to give a colorless liquid boiling at around 133–135° C. at atmospheric pressure. This material was identified as hexamethyldisilylethyne by the analyses of the composition. These analyses showed the refractive index $n_D^{25}=1.4259$; $d_4^{25}=0.763$; and $M_R=57.07$ (calculated 56.82). Analysis of the compound for percent silicon showed it to contain 32.8% silicon as compared to the calculated value of 32.9%. Molecular weight determination on the isolated composition showed it to be about 173 as compared to the theoretical molecular weight of 170.

*Example 2*

The compound hexaphenyldisilylethyne having the formula:

IV  $(C_6H_5)_3Si—C≡C—Si(C_6H_5)_3$ may be prepared in the same way as the hexamethyldisilylethyne was prepared with the exception that instead of using trimethylchlorosilane, one employs triphenylchlorosilane.

*Example 3*

This example illustrates one of the reactions which the organosilylethynes herein disclosed and claimed may undergo. More particularly 20 parts of the hexamethyldisilylethyne prepared in Example 1 was mixed with 50 cc. carbon tetrachloride. Thereafter 19 grams bromine was added slowly to the solution while cooling the mixture in an ice bath. The reaction mixture was then heated for one hour on a steam bath to give a colorless liquid. The solvent was removed and the residual material vacuum distilled. The compound hexamethyldisilyldibromoethene having the formula $(CH_3)_3Si—CBr=CBr—Si(CH_3)_3$ distilled at 167–168° C. at 77 mm. in the form of a colorless liquid which solidified on standing at room temperature. Recrystallation of this material from alcohol gave colorless plates having a melting point of 41–42° C. Analysis of this product showed it to contain 49.4% bromine (calculated 48.5% bromine) and 17.01% silicon (calculated 16.97% silicon).

It will, of course, be apparent to those skilled in the art that in addition to the triorganohalogenosilanes employed above, other triorganohalogenosilanes may be used, for example, triethylchlorosilane, tributylbromosilane, tritolylchlorosilane, dimethylethylchlorosilane, dimethylphenylchlorosilane, vinyl dimethylchlorosilane, etc.

Among the organodisilylethyne compounds which may be prepared by the process described above and in the foregoing examples are, for instance, tetramethyldiphenyldisilylethyne having the formula:

V  $(CH_3)_2(C_6H_5)Si—C≡C—Si(C_6H_5)(CH_3)_2$ dimethyltetraethyldisilylethyne having the formula:

VI  $(CH_3)(C_2H_5)_2Si—C≡C—Si(C_2H_5)_2(CH_3)$ hexapropyldisilylethyne, divinyltetramethyldisilylethyne having the formula:

VII  $(CH_2=CH)(CH_3)_2Si—C≡C—Si(CH_3)_2-$
$(CH=CH_2)$ trimethyl triphenyldisilylethyne having the formula VIII  $(CH_3)_3Si—C≡C—Si(C_6H_5)_3$ etc.

The acetylenic silicon derivatives herein disclosed and claimed are useful as starting materials for making various polymeric compositions. Thus, these compositions may be polymerized with various vinyl polymerization type catalysts, e. g., benzoyl peroxide, etc., to make polymers having utility as insulating or dielectric media. In addition, derivatives from these materials may be made by reaction of the acetylenic silicon compositions with various reactive materials capable of adding across the acetylenic triple bond. Thus, the compositions may be hydrogenated to give olefinic or paraffinic derivatives, depending on the degree of hydrogenation. In addition, hydrogen halides may also be added across the triple bond to completely saturate the latter bond or to add only one molecule of hydrogen halide. The introduction of hydrogen halide adds an additional functional group, namely, a halogen atom, to the compound. Moreover, halogenation of the acetylenic silicon compositions may be carried out by subjecting the above described material to reaction with a halogen, for example, chlorine, fluorine, etc., whereby part or all of the unsatisfied valence bonds of the triple bond may be saturated with halogen.

Organic acids, alcohols, acid chlorides, ammonia, amines may also be added across the triple bond to give new derivatives. Other silicon compositions, particularly silicon compositions containing a silicon-bonded hydrogen and a silicon-bonded halogen, for example, silicochloroform and methyldichlorosilane, may be added across the triple bond to give additional silicon substitution. Finally, such other materials as $H_2S$, mercaptans, HCN, organic nitriles, etc., may also be added to make new derivatives.

The above-described acetylenic silicon compositions can also be copolymerized with various materials including styrene, butadiene, vinyl chloride, vinyl acetate, various acrylates and methacrylates, acrylonitrile, etc., to form new and useful polymeric materials. The ability to polymerize across the triple bond or double bond, in the case of addition compounds, is important for silicone polymers in order to obtain a faster cure for silicone rubbers or quicker drying times for silicone varnishes.

What we claim as new and desire to secure by Letters Patent of the United States is:

1. A composition corresponding to the general formula:

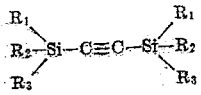

where $R_1$, $R_2$ and $R_3$ are monovalent hydrocarbon radicals selected from the class consisting of alkyl, phenyl, diphenyl, naphthyl, aralkyl, alkaryl, vinyl, allyl, methallyl, and cycloaliphatic radicals.
2. Hexamethyldisilylethyne.
3. Hexaphenyldisilylethyne.
4. Tetramethyldiphenyldisilylethyne.

KURT C. FRISCH.
ROBERT B. YOUNG.

References Cited in the file of this patent

UNITED STATES PATENTS

| Number | Name | Date |
|---|---|---|
| 2,082,569 | Carothers | June 1, 1947 |
| 2,551,924 | Boldebuck | May 8, 1951 |

OTHER REFERENCES

Volnov et al., "Jour. Gen. Chem." (USSR) (1940), vol. 10, pp. 1600–04.

Feiser et al., "Organic Chemistry" (1944), page 78, Heath and Co., publishers, Boston, Mass.

Rochow, "Chemistry of the Silicones" (1946), page 14, Wiley and Son, publishers, New York, N. Y.